United States Patent [19]

Kraus et al.

[11] Patent Number: 4,613,802
[45] Date of Patent: Sep. 23, 1986

[54] PROXIMITY MOISTURE SENSOR

[75] Inventors: Richard A. Kraus, Coral Springs, Fla.; Thomas W. Sabon, Southgate, Mich.

[73] Assignee: Ford Motor Company, Dearborn, Mich.

[21] Appl. No.: 682,501

[22] Filed: Dec. 17, 1984

[51] Int. Cl.[4] ............................ H02P 1/04; B60S 1/04
[52] U.S. Cl. ..................................... 318/483; 318/442; 318/443; 318/444; 318/DIG. 2; 307/10 R; 307/116; 307/118; 250/338
[58] Field of Search ............... 318/443, 483, 641, 642, 318/643, 441, 442, 444, 314, 318, 335, 341, 345 A, 379, 445, DIG. 2, 599, 600, 601, 604, 605, 606, 607, 608, 616, 617; 307/10 R, 116, 117, 118; 250/338; 324/61 R, 61 P; 15/250.12, 350 C

[56] References Cited

U.S. PATENT DOCUMENTS

| 3,795,146 | 3/1974 | Wilson | 324/61 R X |
|---|---|---|---|
| 3,807,055 | 4/1974 | Kraxberger | 324/61 R X |
| 3,826,979 | 7/1974 | Steinmann | 318/483 X |
| 3,882,381 | 5/1975 | Gregory | 324/61 R |
| 4,010,383 | 3/1977 | Grassmann | 307/118 |
| 4,159,473 | 6/1979 | Senk | 307/116 X |
| 4,228,534 | 10/1980 | Fellrath et al. | 307/116 X |
| 4,257,117 | 3/1981 | Besson | 307/116 X |
| 4,272,712 | 6/1981 | Beling et al. | 318/608 X |
| 4,323,829 | 4/1982 | Witney et al. | 318/599 X |
| 4,495,452 | 1/1985 | Boegh-Peterson | 318/444 |
| 4,513,608 | 4/1985 | Cuming | 323/365 X |
| 4,515,015 | 5/1985 | Kuhlman | 324/61 R X |
| 4,525,792 | 6/1985 | Clinton | 307/118 X |
| 4,527,105 | 7/1985 | Shiraishi | 318/444 |
| 4,527,106 | 7/1985 | Fischer | 318/444 X |
| 4,554,493 | 11/1985 | Armstrong | 318/444 |

Primary Examiner—William M. Shoop, Jr.
Assistant Examiner—Shik Luen Paul Ip
Attorney, Agent, or Firm—Peter Abolins; Robert D. Sanborn

[57] ABSTRACT

A device for detecting the presence of water includes a capacitance sensor coupled to a windshield to detect capacitance changes. A multivibrator is coupled to the sensor to translate the detected capacitance change to the frequency domain. A phase-locked loop coupled to the multivibrator produces a phase pulse in response to water causing a change in capacitance and, in turn, a change in the frequency of the multivibrator.

2 Claims, 5 Drawing Figures

PROXIMITY MOISTURE SENSOR

BACKGROUND OF THE INVENTION

1. Field of the Invention

This invention relates to detecting the presence of water on a windshield.

2. Prior Art

The prior art teaches various apparatus for providing a more automatic windshield wiper. That is, the action of the wiper is responsive to the moisture on the windshield. This may mean that the wiper turns on when the windshield is hit by raindrops or that the wiper speed increases as the intensity of the rain increases.

Although various attempts have been made at determining the wetness of a windshield, a satisfactory solution has not been found. For example, in accordance with one method, the amount of drag experienced by the windshield wiper, indicative of a dry or wet windshield, is determined by looking at the amount of current necessary to drive the windshield wiper motor. These are some of the problems this invention overcomes.

SUMMARY OF THE INVENTION

A device for detecting the presence of water adjacent a windshield includes a capacitance sensor coupled to the windshield to detect capacitance changes caused by water. That is, the capacitance of a plate in free space relative to a ground plane is affected by the characteristics of the surroundings, such as water. The change of capacitance is then monitored and used as an indication of moisture. An astable multivibrator is coupled to the capacitance sensor to translate the sensed capacitance to the frequency domain. A phase-locked loop means coupled to the multivibrator generates a frequency deviation signal indicative of the addition of water on the windshield. The frequency deviation signal is used to cause activation of the windshield wiper system.

DETAILED DESCRIPTION OF THE DRAWINGS

DETAILED DESCRIPTION OF THE INVENTION

Figure 1:
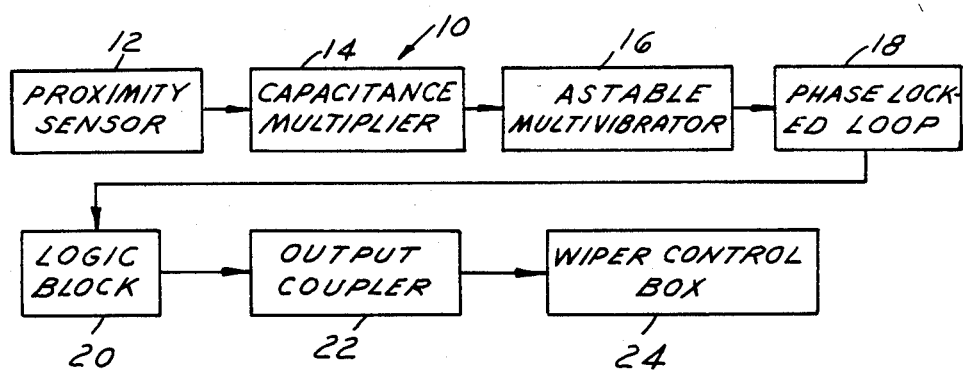
FIG. 1 is a block diagram of a sensing device in accordance with an embodiment of this invention.

Referring to FIG. 1, a detecting device 10 includes the serial combination of a proximity sensor 12, a capacitance multiplier 14, an astable multivibrator 16, a phase-locked loop 18, a logic block 20, an output coupler 22 and a wiper control box 24.

Proximity sensor 12 can respond to a change in the surrounding environment by a change in the magnitude of a capacitance. Rain on the outside of a windshield changes the capacitance associated with a first sensor plate and a second grounded plate attached to the inside of the windshield. The purpose of the grounded plate is to establish a local ground plane and to shape or define the area which will be sensed. Attaching the sensor on the inside of the windshield does not impede the basic wiper function and the sensor is protected from possible damage (see FIG. 5).

Capacitance multiplier 14 is coupled to sensor 12 and amplifies the effect of the changing capacitance of sensor 12. Such an amplified signal representing capacitance is used by astable multivibrator 16 as a frequency determining input. As a result, astable multivibrator 16 translates the capacitance and the capacitance change to the frequency domain.

Phase-locked loop 18 develops phase pulses as a function of frequency change caused by capacitance at sensor 12. The frequency is an input from astable multivibrator 16. Phase-locked loop 18 characteristics are designed such that capacitance changes which are of increasing value are discriminated and used to develop the phase pulses.

A logic block 20 is used to develop a signal indicating a need for windshield wiper activation based on the phase pulse generated by phase-locked loop 18.

Output coupler 22 translates the signal from logic block 20 to a current which can be sensed by a wiper control box 24. Wiper control box 24 then controls the activation of the automobile windshield wipers.

Figure 2:
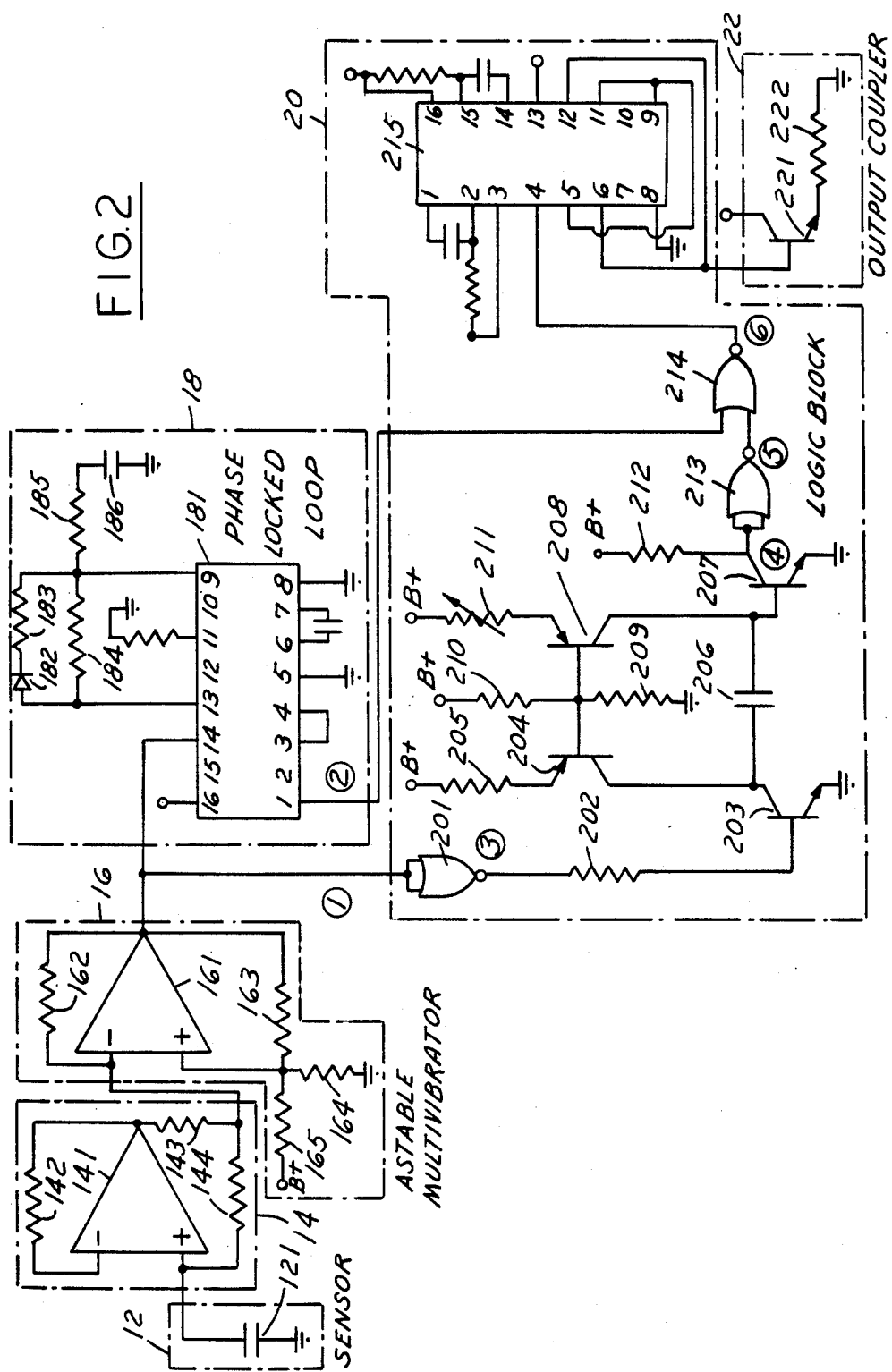
FIG. 2 is a schematic diagram of typical circuitry within the block element shown in FIG. 1.

Referring to FIG. 2, proximity sensor 12 includes a capacitor 121 having a ground plate and a sensor plate. Capacitor 121 is coupled to the input of capacitance multiplier 14 which includes an operational amplifier 141 having a positive input coupled to capacitor 121. The output of operational amplifier 141 is coupled through a resistor 142 back to the negative input of operational amplifier 141. The output of operational amplifier 141 is coupled through the series combination of resistors 143 and 144 to the positive input of operational amplifier 141. A node between resistors 144 and 143 is coupled to the negative input of an operational amplifier 161 included in astable multivibrator 16. A feedback resistor 162 couples the output of amplifier 161 to the negative input of amplifier 161. A feedback resistor 163 couples the output of operational amplifier 161 to the positive input of operational amplifier 161. The positive input of operational amplifier 161 is connected to ground through a resistor 164 and to a B+ voltage through a resistor 165.

Phase-locked loop 18 includes a circuit 181 which responds to a change in frequency and has an input from amplifier 161. That is, when the presence of moisture on the windshield increases the capacitance of sensor 12, the frequency of astable multivibrator 16 decreases. Phase-locked loop 18 has a relatively long time constant in response to such a frequency decrease and generates phase pulses of increased width. In contrast, phase-locked loop 18 has a relatively short time constant in response to a frequency increase (corresponding to a decrease of capacitance of sensor 12) and substantially no phase pulse is generated. As a result, phase-locked loop 18 discriminates its output to indicate the presence of water. The difference between long and short time constants is provided by a diode 182 coupled in series with a resistor 183 between pins 9 and 13 of circuit 181 (typically a CD 4046) and a resistor 184 coupled between pins 9 and 13. The magnitude of resistor 183 (about 3k ohms) is substantially less than resistor 184 (about 1 megohm). The series combination of a resistor 185 and a capacitor 186 is connected between pin 9 and ground.

Logic block 20 has inputs from both multivibrator 16 and phase-locked loop 18. The output of amplifier 161 is applied to both inputs of a NOR-gate 201 which has an output coupled to the base of a transistor 203 through a resistor 202. The emitter of transistor 203 is grounded. The collector of transistor 203 is coupled through the collector-emitter circuit of a transistor 204 and a series resistor 205 to B+ voltage. The collector of transistor 204 is coupled through a capacitor 206 to the base of a transistor 207. The base of transistor 204 is coupled to the base of transistor 208. The base of transistor 208 is coupled to ground through a resistor 209 and coupled to B+ through resistor 210. The emitter of transistor 208 is coupled through a resistor 211 to B+. The collector of transistor 208 is coupled to the base of transistor 207. The emitter of transistor 207 is grounded. The collector of transistor 207 is coupled through a resistor 212 to B+ and to the input of a NOR-gate 21. One input of a NOR-gate 214 is coupled to the output of NOR-gate 213 and the other input is coupled to the output of circuit 181. The output of NOR-gate 214 is coupled to circuit 215 (typically a CD 4098) which has an output coupled to the base of a transistor 221 which is part of output coupler 22. The emitter of transistor 221 is connected to ground through resistor 222. The collector of transistor 221 is connected to B+ voltage.

Figure 3:
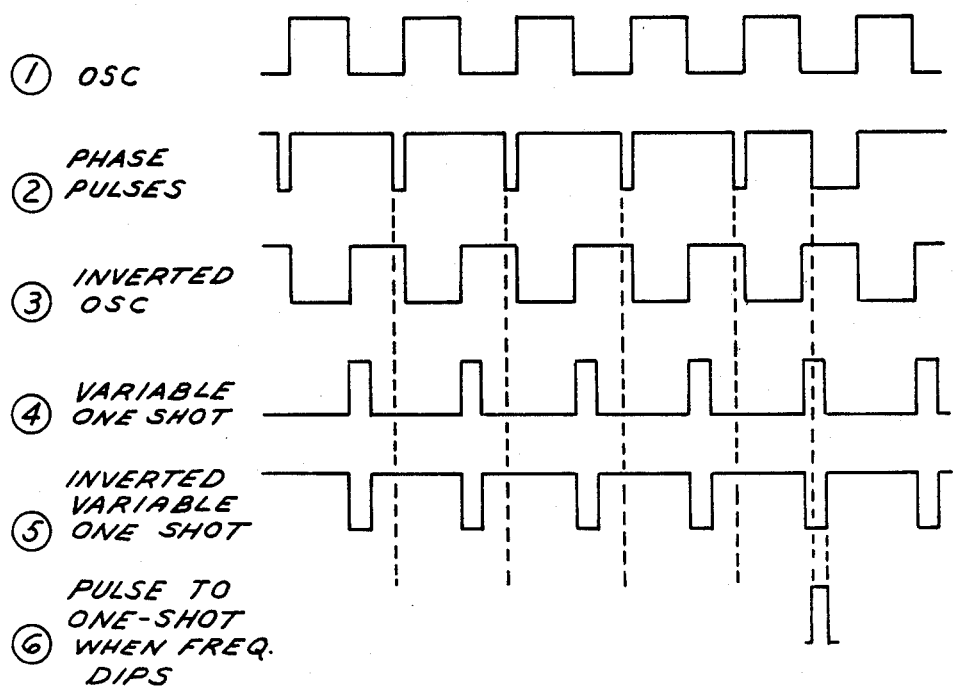
FIG. 3 is the wave form of the voltage signal versus time at various points in the schematic diagram of FIG. 2.

Referring to FIG. 3, the voltage waveforms with respect to time of lines 1, 2, 3, 4, 5 and 6 are the voltages indicated as circled 1, 2, 3, 4, 5 and 6 on FIG. 2. That is, point 1 is the output of astable multivibrator 16, point 2 is the output of phase-locked loop 18, 3 is the output of NOR-gate 201, 4 is the input to NOR-gate 213, 5 is the ouput of NOR-gate 213, and 6 is the output of NOR-gate 214.

Figures 4, 5:
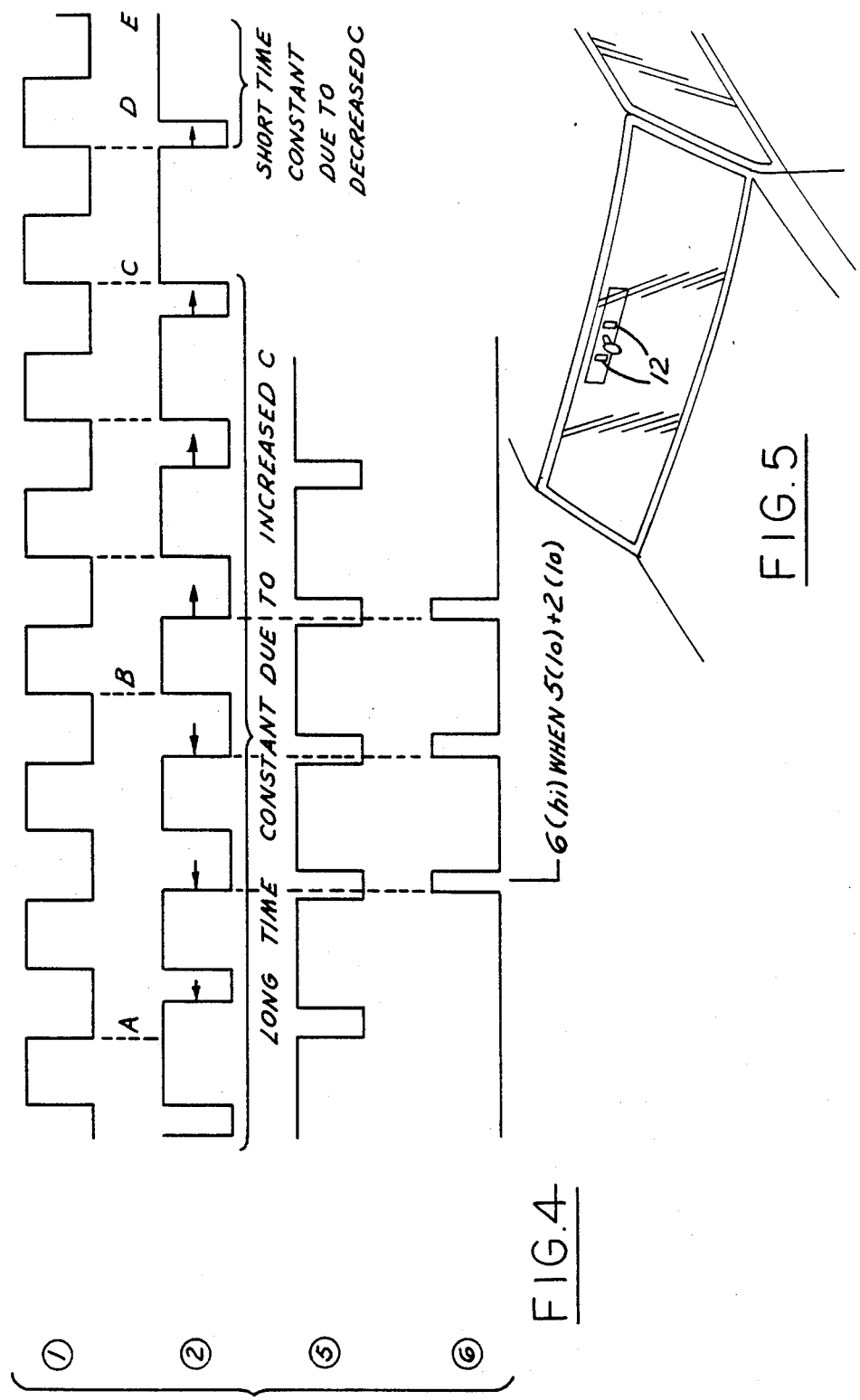
FIG. 4 are selected waveforms of voltage versus time indicating the response to a change in capacitance due to water on the windshield.
FIG. 5 is a perspective view of an automobile windshield with a sensor in accordance with an embodiment of this invention.

In operation, as shown in FIG. 4, the addition of water at sensor 12 causes an increase in capacitance which in turn decreases the frequency of the output applied from astable multivibrator 16 to phase-locked loop 18. The output of phase-locked loop 18 shown on line 2 does not respond rapidly to such change and increases the width of the output phase pulse. That is, there is along time constant in response to an increased capacitance and the width of the phase pulse increases from point A to point B. As phase-locked loop 18 better tracks the change in the frequency applied to it from astable multivibrator 16, the width of the phase pulse decreases between points B and C. When phase-locked loop 18 is perfectly tracking the input supplied to it from astable multivibrator 16, there is no pulse on line 2. The pulse at point D is shown to represent the phase pulse due to decreased capacitance. Phase-locked loop 18 quickly tracks such a decrease and at point E has achieved a stable condition so that there is no phase pulse output. The inputs on lines 2 and 5 of FIG. 4 are applied to NOR-gate 214 in logic block 20. The output of NOR-gate 214 is shown on line 6 and provides a positive pulse when both inputs from line 2 and 5 have a negative going pulses. Thus, as can be seen, as the phase pulse of line 2 grows in width due to an increased capacitance, indicating the presence of moisture, the negative going phase pulse eventually overlaps the negative going inverted variable one shot on line 5. When these two negative going pulses occur at the same time, a positive pulse occurs on line 6 which applies an output from NOR-gate 214 to the input of a one-shot multivibrator circuit 215.

Various modifications and variations will no doubt occur to those skilled in the arts to which this invention pertains. For example, the particular configuration of the phase-locked loop and the output coupler may be varied from that disclosed herein. These and all other variations which basically rely on the teachings through which this disclosure has advanced the art are properly considered within the scope of this invention.

We claim:

1. A device for detecting the presence of water adjacent a first side of a windshield, having two generally planar opposing sides, includes:
    a capacitance sensor means coupled to a second side, opposite from the first side, of the windshield to detect capacitance changes so that said capacitance sensor means is shielded from the water by the windshield;
    an astable multivibrator means coupled to said sensor means for generating an output signal to translate the magnitude of the detected capacitance to the frequency domain;
    a phase-locked loop means coupled to said multivibrator means for developing a phase pulse as a function of frequency change of the output signal of said multivibrator means;
    a logic means coupled to said phase-locked loop means and responsive to the phase pulse for generating a control output indicating water adjacent the windshield and activating a windshield wiper;
    said phase-locked loop means having a longer time constant response to a decrease in the frequency of the output of said multivibrator means than to an increase in the frequency of the output of said multivibrator means so that the output phase pulse of said phase-locked loop means widens in response to water adjacent the windshield;
    said logic means producing a control signal in response to a coincidence between the phase pulse and a signal affected by the output of the multivibrator; and
    said capacitance sensor including a first sensor plate coupled to the windshield and a second sensor plate coupled to the windshield and to ground for establishing a local ground plane.

2. A device for detecting the presence of water adjacent a first side of a windshield having two generally planar opposing sides, including:
    a capacitance sensor means coupled to a second side, opposite from the first side, of the windshield to detect capacitance changes, so that said capacitance sensor is shielded from the water by the windshield;
    a capacitance multiplier means coupled to said capacitance sensor means for multiplying the capacitance detected by said capacitance sensor means;
    an astable multivibrator means coupled to said capacitance multiplier means to translate the sensed capacitance and the capacitance changes to the frequency domain;
    a phase-locked loop means coupled to said astable multivibrator means for developing a phase pulse signal as a function of frequency change;
    a logic block means coupled to said astable multivibrator means and said phase-locked loop means for developing a signal affected by the magnitude of the phase pulse output of said phase-locked loop means;

an output coupler coupled to said logic block means to generate a current which is indicative of capacitance sensed by said sensor means;

a control means coupled to said output coupler for using the current generated by said output coupler to control a windshield wiper system;

said phase-locked loop means producing an indication of greater magnitude in response to an increased magnitude of capacitance detected by said capacitance sensor means (indicating water on the windshield) than a decreased magnitude of capacitance detected by said capacitance sensor means; and said phase-locked loop means including a first RC time constant used in association with increases of sensor means capacitance and a second RC time constant, different in magnitude from said first RC time constant, used in association with decreases of sensor means capacitance.

* * * * *